United States Patent

Torii et al.

[11] Patent Number: 5,808,250
[45] Date of Patent: Sep. 15, 1998

[54] MOBILE MEMBER POSITION DETECTION APPARATUS

[75] Inventors: Katsuhiko Torii, Shizuoka-ken; Mitsuhiro Ikeya, Hamamatsu; Kengo Yamamura, Shizuoka-ken, all of Japan

[73] Assignee: Asmo Co., Ltd., Shizuoka-ken, Japan

[21] Appl. No.: 587,758

[22] Filed: Nov. 22, 1995

[30] Foreign Application Priority Data

Nov. 22, 1994 [JP] Japan .................................. 6-288346

[51] Int. Cl.⁶ .......................... H01H 19/00; B60J 7/057
[52] U.S. Cl. ...................... 200/19 R; 200/30 R; 296/223
[58] Field of Search ................ 200/19 R–31 R, 200/61.12–61.75, 61.76–61.82, 573, 574; 296/216–224

[56] References Cited

U.S. PATENT DOCUMENTS

| | | | |
|---|---|---|---|
| 4,436,338 | 3/1984 | Jardin | 296/223 |
| 4,468,063 | 8/1984 | Yukimoto et al. | 296/223 |
| 4,659,141 | 4/1987 | Masuda et al. | 296/223 |
| 4,700,026 | 10/1987 | Kamiyama et al. | 200/19 R X |
| 5,147,989 | 9/1992 | Ito | 200/19 R X |

FOREIGN PATENT DOCUMENTS

| | | |
|---|---|---|
| 2649629 | 5/1978 | Germany . |
| 2027816 | 8/1978 | Germany . |
| 2734512 | 2/1979 | Germany . |
| 3335407 | 5/1985 | Germany . |
| 3532078 | 4/1986 | Germany . |
| 4401463 | 7/1994 | Germany . |
| 2-190587 | 7/1990 | Japan . |

Primary Examiner—J. R. Scott
Attorney, Agent, or Firm—Hazel & Thomas

[57] ABSTRACT

There is provided a mobile member position detection apparatus in which not only high-accuracy detection of a position of a window glass or the like of a power window apparatus but also setting of an initial position being free from cumbersome adjustment can be realized with a simple structure at low cost. In this position detection apparatus, a transmission plate and a cam plate are rotated together with the rotating shaft of a window regulator, and a limit switch is rendered conductive to detect a predetermined rotational position. Thereafter, when the rotating shaft is rotated, the intermeshing state between a tooth portion and a tooth portion obtained by a wave washer is released, and rotation of the rotating shaft is not transmitted to the cam plate. Therefore, when the rotating shaft (drive motor) is sufficiently rotated during an incorporating operation, an initial state wherein a projecting portion is brought into contact with a stopper to render the limit switch conductive is automatically set.

22 Claims, 4 Drawing Sheets

MOBILE MEMBER POSITION DETECTION APPARATUS

BACKGROUND OF THE INVENTION

1. Field of the Invention

The present invention relates to a mobile member position detection apparatus used in a power window apparatus for moving a window glass of a vehicle door to open/close it or a sunroof apparatus for moving a sunroof to open/close it, or the like.

2. Description of the Related Art

A motor is used as a drive source in a power window apparatus for vertically moving a window glass of a vehicle to open/close it or a sunroof apparatus for moving a sunroof to open/close it.

In this case, for example, some power window apparatus have a so-called catch-in prevention function for preventing a passenger's body or a foreign object from unnecessarily being caught by the window glass. In a power window apparatus having such a catch-in prevention function, a limit switch is arranged at a predetermined position of a door, to check on the basis of a signal from the limit switch and a lock current of a motor whether a foreign object is caught in the window glass, to control movement of the window glass, i.e., the rotational position of the motor. In another example, a Hall IC or a special commutator is arranged to detect the rotational speed of an armature, and whether a foreign object is caught in the window glass is checked on the basis of the resultant rotational speed detection signal (pulse number or pulse width of a pulse signal) to control the rotational position of the motor.

In such a power window apparatus or mechanism for detecting the rotational position of a motor, when a motor or a window regulator is to be incorporated, cumbersome adjustment of the incorporation position or a cumbersome reset operation upon the incorporation is inevitably required.

More specifically, for example, in the catch-in prevention mechanism constituted on the basis of a lock current of a motor or a signal from a limit switch arranged at a door, the motor or window regulator must be incorporated in a vehicle body in not only a state wherein the vertical position of the window glass corresponds to a predetermined rotational position of a motor rotating shaft, but also a state wherein the limit switch corresponds to a predetermined position of the window glass. For this reason, adjustment of the incorporation position is cumbersome, and a large number of parts are required. In addition, even if the limit switch or the like is set at an optimum position at the beginning of Incorporation, readjustment must be performed each time the window glass is made unstable in subsequent use of the power window apparatus. In addition, in the catch-in prevention mechanism constituted on the basis of the rotational speed detection signal or pulse signal from the armature, even if the motor rotating shaft is initially set in correspondence with the window glass at the beginning of incorporation, as in the above-mentioned mechanism, thereafter, when the window glass is made unstable, the positional relationship between the window glass and the motor rotating shaft must be reset again.

In this manner, in the conventional mechanism for detecting the rotational position of a motor used in a power window apparatus, a sunroof apparatus, or the like, cumbersome adjustment of an incorporation position during an incorporating operation or cumbersome reset upon the incorporating operation must be performed. In addition, when a catch-in prevention mechanism is to be constituted, the costs of other parts such as a controller and the like are high, and a high degree of accuracy cannot be obtained.

SUMMARY OF THE INVENTION

The present invention has been made in consideration of the above circumstances, and its object is to provide a mobile member position detection apparatus in which, when the mobile member position detection apparatus is used in a power window apparatus, a sunroof apparatus, or the like, not only highly accurate detection of the position of a window glass or a sunroof, but also setting of an initial position free from cumbersome adjustment can be realized with a simple structure at low cost.

According to the first aspect of the present invention, there is provided a mobile member position detection apparatus for detecting a predetermined moving position of a mobile member which is rotationally moved in a forward/backward direction, comprising:

a switch unit capable of detecting a predetermined rotational position of the mobile member by ON/OFF-operation of the switch unit;

a transmission plate which is connected to the mobile member and is always moved together with the mobile member by torque transmitted from the mobile member;

a cam plate which is formed with a cam portion engageable with the switch unit, which is rotated by torque transmitted from the transmission plate, and which causes the cam portion to be engaged with the switch unit at the predetermined rotational position of the mobile member to operate the switch unit; and a clutch mechanism for transmitting the torque from the transmission plate to the cam plate and for interrupting transmission of forward torque from the transmission plate to the cam plate at the time when the cam plate is rotated in the forward direction by a predetermined amount after the switch unit is operated.

According to the second aspect of the present invention, there is provided a mobile member position detection apparatus for detecting a predetermined position of a mobile member moved between a first position and a second position by a drive force from a rotational drive source rotated in a forward/backward direction, comprising:

a switch unit capable of detecting the predetermined position of the mobile member by ON/OFF-operating the switch unit;

a transmission plate which is connected to the rotational drive source, which is always moved together with the rotational drive source by torque transmitted from the rotational drive source, and which has one clutch portion; and a cam plate which is formed with a cam portion engageable with the switch unit, which has the other clutch portion engaged with the one clutch portion to move together with the transmission plate in a normal state, which, when the rotational drive source is rotated in the forward direction to move the mobile member in the forward direction to the first position, releases engagement between the one clutch portion and the other clutch portion to stop the cam plate at the time when the cam plate is moved in the forward direction by a predetermined amount after the cam portion is engaged with the switch unit, thereby causing the stop position of the cam plate to correspond to the first position of the mobile member.

According to the present invention, in the mobile member position detection apparatus, when a rotational drive source is rotated in a forward/backward direction, a transmission plate is rotated together with the rotational drive source, and a cam plate is rotated together with the rotating transmission plate. When the mobile member reaches a predetermined position, the cam portion of the cam plate is engaged with a switch unit to operate the switch unit, thereby detecting the predetermined position of the mobile member.

In this case, when the cam plate is rotated in the forward direction by a predetermined amount after the switch unit is operated, the transmission of forward torque from the transmission plate to the cam plate by the clutch mechanism is interrupted. More specifically, when the cam plate is rotated in the forward direction by the predetermined amount after the switch unit is operated, the cam plate is not moved and the switch unit is kept operating, even if the rotational drive source (transmission plate) is rotated in the forward direction. In other words, once the mobile member is sufficiently rotated in the forward direction, the mobile member position detection apparatus is automatically set in the initial state wherein the switch unit is operated.

Therefore, for example, In case that this position detection apparatus is used in a vehicle power window apparatus having a catch-in prevention function, once the rotating shaft of the power window apparatus is sufficiently rotated in the forward direction when the position detection apparatus is incorporated in the vehicle body, the position detection apparatus is automatically set in an initial state in which the switch unit is operated. For this reason, the initial position can be easily set without cumbersome adjustment of the incorporation position during the incorporating operation and cumbersome reset upon the incorporating operation.

Since this position detection apparatus has a very simple arrangement constituted by the transmission plate and the cam plate, the position detection apparatus only requires a small number of parts and is manufactured at low cost. The position detection apparatus can also be applied to any rotationally moving portion, and the range of applications to which the position detection apparatus can be directed is considerably widened.

In addition, in a position detection apparatus having an arrangement in which the rotational speed of the armature of a motor for driving a power window apparatus is detected by using a Hall IC or the like to detect the motor rotating shaft, i.e., the moving position of the window glass, a control circuit therefor inevitably requires a counter. However, the position detection apparatus according to the present invention can determine a correct position on the basis of only one ON/OFF signal, a control circuit for the position detection apparatus does not require a counter, and the position detection apparatus can be manufactured at low cost.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DETAILED DESCRIPTION OF THE PREFERRED EMBODIMENTS

Figure 3:
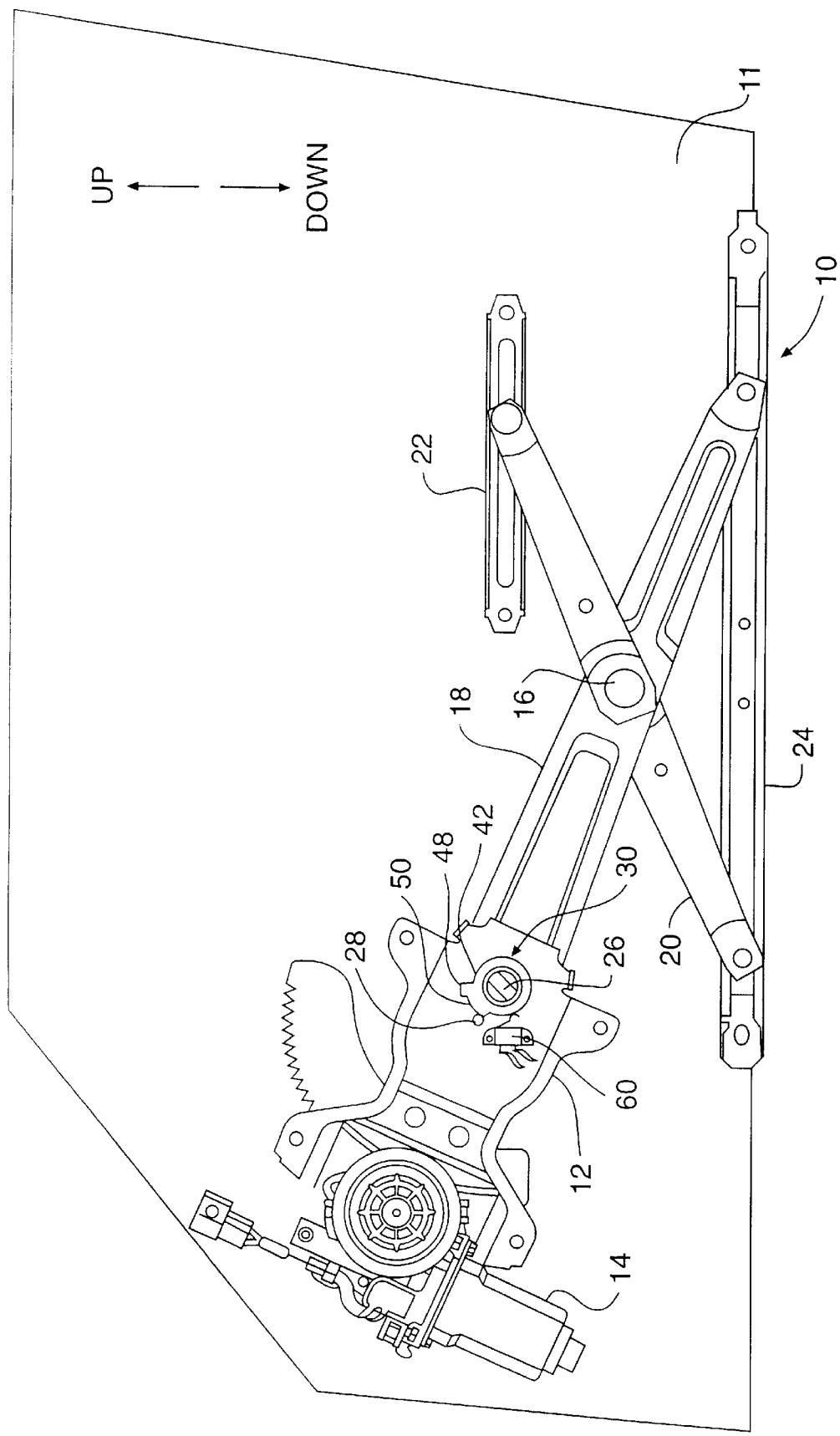
FIG. 3 is a front view of a window regulator of a power window apparatus to which the position detection apparatus according to the first embodiment of the present invention is applied.

FIG. 3 is a front view of a window regulator 10 of a power window apparatus to which a position detection apparatus 30 according to the first embodiment of the present invention is applied. The window regulator 10 is of a so-called X-arm type, and is constituted by a drive motor 14 attached to a regulator base 12, arms 18 and 20 connected and supported by a connection shaft 16, guide rails 22 and 24, and the like. The regulator base 12 and the guide rail 22 are fixed to a door (not shown), the guide rail 24 can be vertically moved, and a window glass 11 is attached to the guide rail 24. The position detection apparatus 30 is equipped to a rotating shaft 26 which supports the arm 18 to the regulator base 12. This rotating shaft 26 is integrally connected to the arm 18 and rotatably supported by the regulator base 12.

Figure 1:
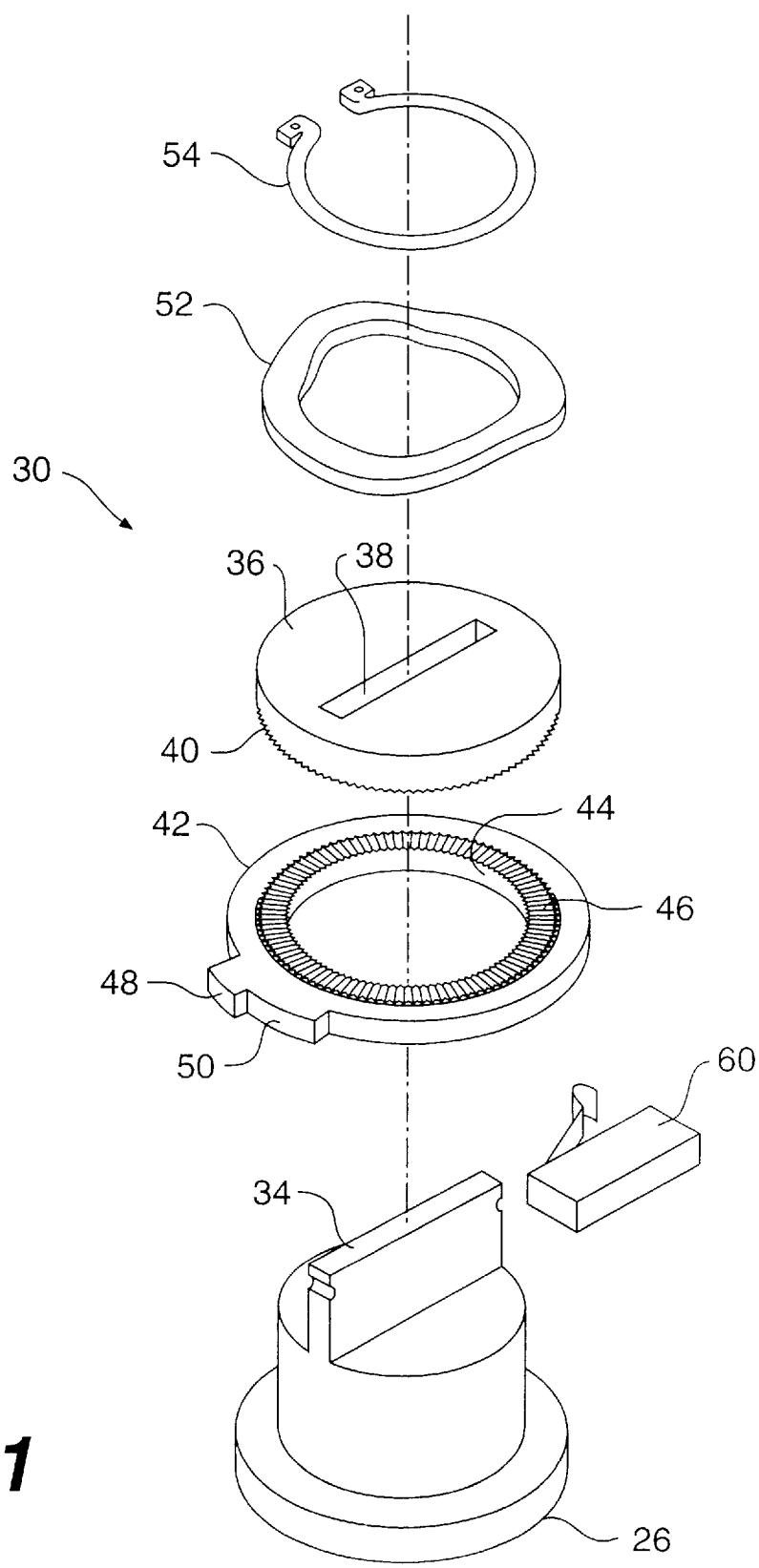
FIG. 1 is an exploded perspective view of a position detection apparatus according to the first embodiment of the present invention.

FIG. 1 shows an exploded perspective view of the position detection apparatus 30. The position detection apparatus 30 is arranged around the rotating shaft 26. A prism-shaped fitting portion 34 is formed at the tip portion of the rotating shaft 26 in its axial direction, and the fitting portion 34 is fitted into a transmission plate 36. The transmission plate 36 is formed to have a disk-like shape, and has a rectangular fitting hole 38 formed in the central portion of the transmission plate. The fitting portion 34 of the rotating shaft 26 is inserted into the fitting hole 38. In this manner, the transmission plate 36 is always rotated integrally with the rotating shaft 26, and is able to move relative to the rotating shaft 26 in the axial direction. In addition, a tooth portion 40 constituting a clutch mechanism is formed in the lower surface on the rotating shaft 26 side of the transmission plate 36 in the circumferential direction by, e.g., a knurling tool or the like.

A cam plate 42 is arranged between the transmission plate 36 and the rotating shaft 26. The cam plate 42 is formed to have a disk-like shape, and has a through hole 44 formed in the central portion of the cam plate 42. The rotating shaft 26 is inserted into the through hole 44 so that the cam plate 42 is arranged coaxially with the rotating shaft 26 and can be rotated relative to the rotating shaft 26. In addition, a tooth portion 46 which corresponds to the tooth portion 40 of the transmission plate 36 and constitutes a clutch mechanism like the tooth portion 40 is formed in the peripheral portion of the through hole 44 in the circumferential direction. For this reason, in a state wherein the tooth portion 40 is meshed with the tooth portion 46, the cam plate 42 is rotated integrally with the transmission plate 36.

Figure 2A:
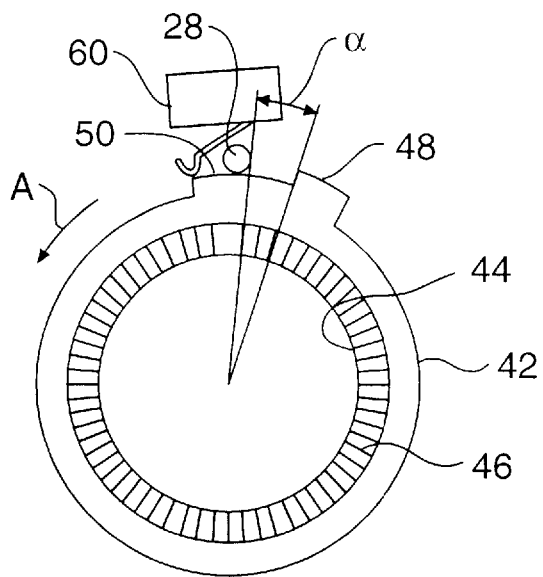
FIGS. 2A and 2B are plan views showing the relationship between a cam plate and a limit switch in the position detection apparatus according to the first embodiment of the present invention.

As also shown in FIG. 2, a projecting portion 48 is formed at a portion of the periphery of the cam plate 42 to project from that peripheral portion. This projecting portion 48 corresponds to a stopper 28 formed at the regulator base 12 to project therefrom. When the cam plate 42 is rotated in the forward direction as indicated by an arrow A in FIG. 2A to reach a predetermined rotational position, the projecting portion 48 is brought into contact with stopper 28, and further rotation of the cam plate 42 in the forward direction is stopped. A cam portion 50 is formed to project from the cam plate 42 on the side of the projecting portion 48 in such a manner that the cam portion 50 is connected to the projecting portion 48. The cam portion 50 can be engaged with a limit switch 60, as will be described later, arranged on the regulator base 12.

On the other hand, a wave washer 52 constituting the clutch mechanism is arranged on the upper surface side opposing the tooth portion 40 of the transmission plate 36, and is held by a snap ring 54 fixed to the tip portion of the rotating shaft 26. Since the wave washer 52 always presses the transmission plate 36, the tooth portion 40 of the transmission plate 36 is meshed with the tooth portion 46 of the cam plate 42 in a normal state. In the state wherein the projecting portion 48 of the cam plate 42 is brought into contact with the stopper 28 to stop further rotation of the cam plate 42 in the forward direction, the forward torque of the transmission plate 36 which exceeds the intermeshing pressure holding force obtained by the wave washer 52 between the tooth portion 40 and the tooth portion 46 acts so as to release the intermeshing state between the tooth portion 40 and the tooth portion 46, thereby making it possible to rotate the transmission plate 36 relative to the cam plate 42. More specifically, the wave washer 52 is designed to interrupt transmission of the forward torque from the transmission plate 36 and rotating shaft 26 to the cam plate 42 after the projecting portion 48 of the cam plate 42 is brought into contact with the stopper 28. Therefore, in the state wherein the projecting portion 48 is brought into contact with the stopper 28 to stop further rotation of the cam plate 42 in the forward direction, when the rotating shaft 26 is rotated In the forward direction, only the transmission plate 36 is rotated.

The limit switch 60 corresponding to the cam portion 50 of the cam plate 42 described above is electrically connected to the control circuit of the power window apparatus, and is pressed by the cam portion 50 to be rendered conductive, so that the rotational position of the cam plate 42, i.e., the rotational position of the transmission plate 36, i.e., the rotating shaft 26 can be detected. The limit switch 60 is used to control rotation of the drive motor 14, as will be described later.

In this case, according to this embodiment, the dimensions and the like of the respective parts are set as follows. That is, when the window glass 11 in an open state is moved upward to reach a position being 4 mm apart from the upper-end stop position in the lower direction, as shown in FIG. 2A, the projecting portion 48 reaches a position shifted by a rotational angle of a' on the upstream side from the position where the projecting portion 48 is brought into contact with the stopper 28. At this time, the cam portion 50 is engaged with the limit switch 60 to be set in an ON state or conductive, and, thereafter, this ON state, wherein the cam portion 50 is engaged with the limit switch 60, is kept until the projecting portion 48 is brought into contact with the stopper 28.

In contrast to the above description, the following arrangement is also available. That is, when the window glass 11 in an open state is moved upward to reach the position being 4 mm apart from the upper-end stop position in the lower direction, and the projecting portion 48 reaches the position shifted by the rotational angle of a' on the upstream side, from the position where the projecting portion 48 is brought into contact with the stopper 28, the limit switch 60 is rendered in an OFF state or non-conductive, thereby detecting a position. Alternatively, after the ON/OFF state is set as described above, this ON/OFF state need not be electrically kept. An arrangement in which whether the cam plate 42 reaches a predetermined rotational position is checked by detecting a trigger signal obtained by operating the limit switch 60 is also available.

The operation of the first embodiment will be described below with reference to a case wherein the raising switch of the power window apparatus is operated to move the window glass 11 upward.

In the position detection apparatus 30 with the above arrangement, when the raising switch of the power window apparatus is operated, the drive motor 14 operates to operate the window regulator 10, thereby moving the window glass 11 upward. In this case, the moving position of the window glass 11, i.e., the rotational position of the drive motor 14, corresponds to the rotational position of the rotating shaft 26 of the window regulator 10.

In this case, in a normal state, such as in the middle of upward moving of the window glass 11, the transmission plate 36 is pressed by the wave washer 52, and the tooth portion 40 is meshed with the tooth portion 46 of the cam plate 42. Therefore, the torque of the rotating shaft 26 is transmitted to the cam plate 42 through the transmission plate 36 to gradually rotate the cam plate 42 in the forward direction.

The position detection apparatus 30 detects the predetermined rotational position of the drive motor 14, i.e., whether the window glass 11 reaches the predetermined position 4 mm apart from the upper-end stop position in the lower direction).

More specifically, in the position detection apparatus 30, the torque of the rotating shaft 26 is transmitted to the cam plate 42 to gradually rotate the cam plate 42 in the forward direction. If the window glass 11 does not reach the position being 4 mm apart from the upper-end stop position in the lower direction, the projecting portion 48 of the cam plate 42 is far apart from the stopper 28, and the cam portion 50 is not in contact with the limit switch 60, and the limit switch 60 is in an OFF state. In this manner, the rotational position (indicating that the window glass 11 does not reach the position being 4 mm apart from the upper-end stop position in the lower direction of the rotating shaft 26 is detected. In this case, with keeping the motor 14 operating, whether a foreign object is caught in the window glass 11 is checked on the basis of a lock current or the like of the drive motor 14. When it is detected that the foreign object is caught in the window glass, the drive motor 14 is rotated in the backward direction, thereby moving the window glass 11 downward.

On the other hand, when the window glass 11 reaches the position being 4 mm apart from the upper-end stop position in the lower direction, as shown in FIG. 2A, the projecting portion 48 of the cam plate 42 reaches the position shifted by the rotational angle of a' on the upstream side from the position where the projecting portion 48 is brought into contact with the stopper 28. At this time, the cam portion 50 is brought into contact with the limit switch 60 to set the limit switch 60 in an ON state, thereby detecting the rotational position, which indicates that the window glass 11 reaches the position being 4 mm apart from the upper-end stop position in the lower direction, of the rotating shaft 26.

When it is detected that the rotating shaft 26 reaches the predetermined rotational position, i.e., that the window glass 11 reaches the predetermined position, the operation of the drive motor 14 is continued. In this case, although the relative contact position between the cam portion 50 of the cam plate 42 and the limit switch 60 changes, the limit switch 60 is kept in an ON state.

It is checked on the basis of the lock current or the like of the motor 14 whether the window glass 11 is fully closed. When the full-closed state of the window glass 11 is detected, the motor 14 is stopped.

In this manner, in the position detection apparatus 30, when the cam portion 50 of the cam plate 42 rotated by the rotating shaft 26 is brought into contact with the limit switch 60, the rotational position of the rotating shaft 26, i.e., the position of the window glass 11, and specifically whether the window glass 11 reaches the position being 4 mm apart from the upper-end stop position in the lower direction, can be detected with a high degree of accuracy.

In this case, in the position detection apparatus 30, once the motor 14 is sufficiently rotated in the forward direction when the position detection apparatus 30 is incorporated in the vehicle body, the position detection apparatus 30 can be automatically set in an initial state wherein the cam portion 50 of the cam plate 42 is in contact with the limit switch 60.

Figure 2B:
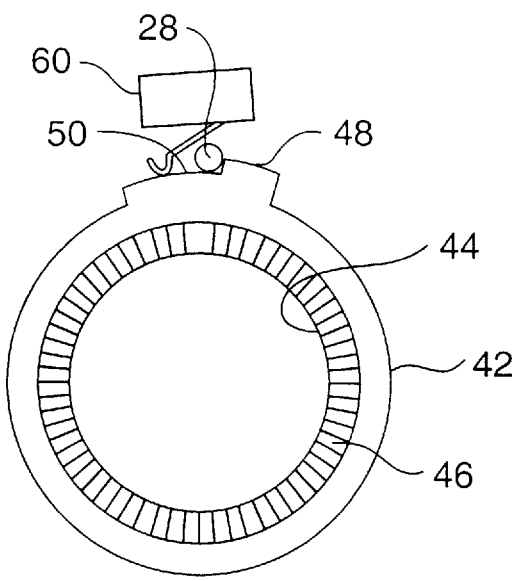

More specifically, once the motor 14 is rotated in the forward direction when the position detection apparatus 30 is incorporated in the vehicle body, first, as shown in FIG. 2B, the projecting portion 48 of the cam plate 42 is brought into contact with the stopper 28 to stop further rotation of the cam plate 42 in the forward direction. In this state, when the motor 14, i.e., the rotating shaft 26, is rotated further, the torque of the transmission plate 36 which exceeds the intermeshing force between the tooth portion 40 of the transmission plate 36 and the tooth portion 46 of the cam plate 42 acts to cause the wave washer 52 to release the pressure of the transmission plate 36, that results in the intermeshing state between the tooth portion 40 and the tooth portion 46 of the transmission plate 36, thereby making it possible to rotate the transmission plate 36 relative to the cam plate 42. More specifically, the wave washer 52 can interrupt transmission of the forward torque from the transmission plate 36 and the rotating shaft 26 to the cam plate 42 after the projecting portion 48 of the cam plate 42 is brought into contact with the stopper 28. For this reason, in the state wherein the projecting portion 48 is brought into contact with the stopper 28 to stop rotation of the cam plate 42, when the rotating shaft 26 is rotated in the forward direction, only the transmission plate 36 is rotated. Therefore, after the projecting portion 48 of the cam plate 42 is brought into contact with the stopper 28 and the cam portion 50 is brought into contact with the limit switch 60, thereby setting the limit switch 60 in an ON state, even if the motor 14 via the rotating shaft 26 is rotated in the forward direction, the cam plate 42 is not moved to keep the ON state of the limit switch 60. More specifically, once the drive motor 14 via the rotating shaft 26 is sufficiently rotated in the forward direction, the position detection apparatus is automatically set in the initial state wherein the projecting portion 48 is brought into contact with the stopper 28 and the limit switch 60 is rendered conductive.

In other words, since the position detection apparatus 30 can mechanically store the position of a predetermined distance, such as 4 mm in this embodiment, apart from the full-closed position or maximum upper moving limit of the window glass 11, regardless of whether the window glass 11 reaches the full-closed position or maximum upper moving limit detection is performed with reference to the position being 4 mm apart from the full-closed position, movement of the window glass 11 can be reliably controlled without error. For example, in a conventional arrangement in which the moving position of the window glass 11 is detected by detecting the rotational speed of the armature of a motor, reset is performed with reference to the full-closed position of the window glass 11. However, if the window glass 11 is stopped not to reach the true maximum upper moving limit because of a decrease in power supply voltage or an increase in frictional resistance between the window glass 11 and a window frame, reset is performed in such a manner that the false stop position is regarded as the full-closed position. For this reason, in this case, since the drive control of the motor is performed with reference to the false full-closed position of the window glass 11, an error considerably increases. In contrast to this, in the position detection apparatus 30, even if the window glass 11 is stopped not to reach the true full-closed position (maximum upper moving limit), it is reliably detected that thereafter the window glass 11 passes through the position being 4 mm apart from the true full-closed position. Therefore, moving control of the window glass 11 can be reliably performed without an error.

In this manner, once the motor 14 is sufficiently rotated in the forward direction when the position detection apparatus 30 is incorporated in the vehicle body to sufficiently rotate the rotating shaft 26 in the forward direction once, the position detection apparatus 30 is automatically set in the initial state wherein the projecting portion 48 of the cam plate 42 is brought into contact with the stopper 28 and the cam portion 50 is brought into contact with the limit switch 60, thereby rendering the limit switch 60 conductive. Therefore, an initial position can be easily set without cumbersome adjustment of an incorporation position during an incorporating operation or cumbersome reset upon the incorporating operation. In addition, moving control of the window glass 11 can be reliably performed without an error.

The second embodiment of the present invention will be described below. Note that the same reference numerals as in the first embodiment basically denote the same parts in the second embodiment, and a description thereof will be omitted.

Figure 4:
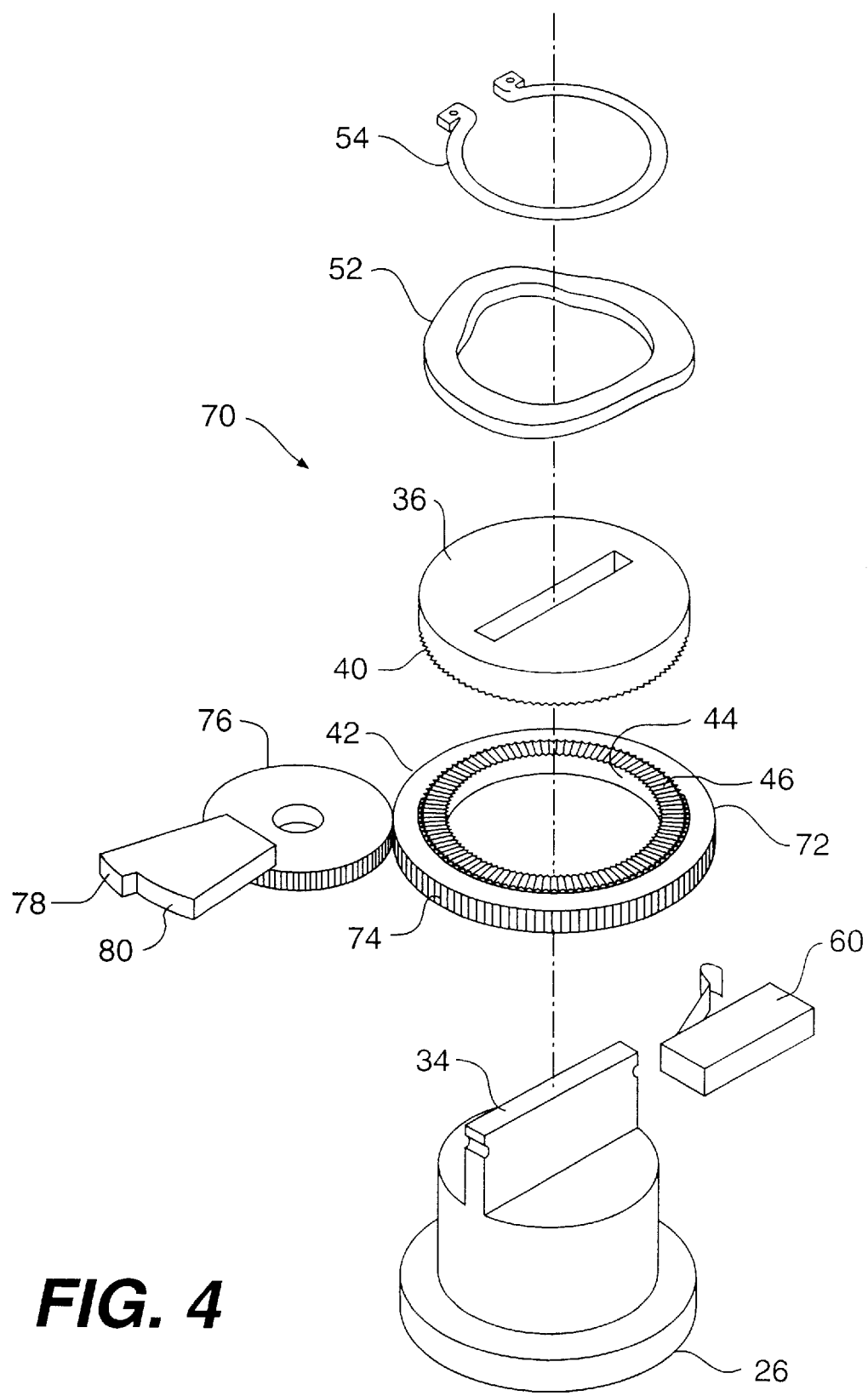
FIG. 4 is an exploded perspective view of a position detection apparatus according to the second embodiment of the present invention.

FIG. 4 shows an exploded perspective view of a position detection apparatus 70 according to the second embodiment of the present invention. In this position detection apparatus 70, a cam plate 72 is arranged in place of the cam plate 42 in the first embodiment. A gear portion 74 is formed in the peripheral portion of the cam plate 72 throughout its whole circumference, and the gear portion 74 is meshed with a speed increasing gear 76. The number of teeth of the speed increasing gear 76 is set to be smaller than the number of teeth of the gear portion 74 of the cam plate 72. For this reason, the speed increasing gear 76 is rotated at a speed higher than that of the cam plate 72.

Like the projecting portion 48 and the cam portion in the first embodiment, a projecting portion 78 and a cam portion 80 are integrally formed to project from the speed increasing gear 76. The projecting portion 78 and the cam portion 80 can be engaged with a stopper 28 and a limit switch 60, respectively.

In the position detection apparatus 70 according to the second embodiment, the cam plate 72 is rotated by torque transmitted from a transmission plate 36, and the rotational speed is increased to rotate the speed increasing gear 76. With the rotation of the speed increasing gear 76, the cam portion 80 is brought into contact with the limit switch 60 to render the limit switch 60 conductive. In this manner, the rotational position of the rotating shaft 26, i.e., the position of the window glass 11, and specifically, whether the window glass 11 reaches a position being 4 mm apart from the upper-end stop position, can be detected with a high degree of accuracy.

In this position detection apparatus 70, once a motor 14 is sufficiently rotated in the forward direction when the position detection apparatus 70 is incorporated in the vehicle body to sufficiently rotate the rotating shaft 26 in the forward direction once, the position detection apparatus 70 is automatically set in the initial state wherein the projecting portion 78 is brought into contact with the stopper 28 and the cam portion 80 is brought into contact with the limit switch 60, thereby rendering the limit switch 60 conductive. Therefore, an initial position can be easily set without cumbersome adjustment of an incorporation position during an incorporating operation or cumbersome reset upon the incorporating operation. In addition, moving control of the window glass 11 can be reliably performed without an error.

In addition, in the position detection apparatus 70, the rotational speed of the cam plate 72 is increased to rotate the speed increasing gear 76, i.e., the cam portion 80 is rotated with a higher rotating speed amplified from the rotating speed of the rotating shaft 26. Therefore, the accuracy of a timing at which the cam portion 80 is brought into contact with the limit switch 60 to operate the same is further improved, and the position can be detected at a high accuracy. For this reason, the position detection apparatus 70 is further effective.

Note that in each of the embodiments described above, the position detection apparatus 30 or 70 is applied to the window regulator 10 of the power window apparatus. However, the present invention is not limited to these embodiments, and can also be applied to a case, for example, wherein the moving position of a sunroof of a sunroof apparatus is detected to perform control.

As has been described above, a position detection apparatus according to the present invention can detect a predetermined moving position of a mobile member at a high accuracy. When this position detection apparatus is used in a power window apparatus or a sunroof apparatus, the position detection apparatus can not only detect the position of a window glass or a sunroof at a high accuracy to make it possible to perform high-accuracy moving control, but also can easily be set at an initial position without cumbersome adjustment of an incorporation position during an incorporating operation or cumbersome reset upon the incorporating operation. In addition, the present invention has an excellent effect that the position detection apparatus can be realized with a simple structure at low cost.

What is claimed is:

1. A mobile member position detection apparatus for detecting a predetermined moving position of a mobile member which is rotationally moved in a forward or backward direction, comprising:

a switch unit for detecting a predetermined rotational position of said mobile member by ON/OFF-operating said switch unit;

a transmission plate movably connected to said mobile member so as to be movable together with said mobile member by torque transmitted from said mobile member;

a cam plate formed with a cam portion engageable with said switch unit, said cam plate being operatively positioned to be rotated by torque transmitted from said transmission plate, whereby said cam portion engages with said switch unit at the predetermined rotational position of said mobile member so as to operate said switch unit; and a clutch mechanism for transmitting the torque from said transmission plate to said cam plate and for interrupting transmission of forward torque from said transmission plate to said cam plate when said cam plate is rotated in a forward direction by a predetermined amount after said switch unit is operated.

2. A mobile member position detection apparatus according to claim 1, wherein said clutch mechanism includes a transmission plate tooth portion formed in said transmission plate, a cam plate tooth portion formed in said cam plate to correspond to said transmission plate tooth portion of said transmission plate, and a wave washer for engaging said transmission plate tooth portion with said cam plate tooth portion.

3. A mobile member position detection apparatus according to claim 1, wherein said cam plate further includes a projecting portion operatively positioned to interrupt transmission of forward torque from said transmission plate to said cam plate against a transmitting force of said clutch mechanism when said projecting portion engages with a stopper.

4. A mobile member position detection apparatus according to claim 1, wherein said cam plate has a pair of inter-engaging gears operatively positioned to increase a speed of rotation transmitted from said transmission plate, whereby said cam portion is rotated with the increased speed.

5. A mobile member position detection apparatus according to claim 1, wherein said mobile member is a rotating shaft connected to a rotational drive source.

6. A mobile member position detection apparatus for detecting a predetermined position of a mobile member moved between a first position and a second position by a drive force from a rotational drive source rotated in a forward or backward direction, comprising:

a switch unit for detecting the predetermined position of said mobile member by ON/OFF-operating said switch unit;

a transmission plate operatively connected to said rotational drive source, whereby said transmission plate is movable together with said rotational drive source by torque transmitted from said rotational drive source, said transmission plate including a first clutch portion; and a cam plate having a cam portion engageable with said switch unit and a second clutch portion operatively engaged with said first clutch portion whereby said cam plate moves together with said transmission plate, said cam plate including means for releasing engagement between said first clutch portion and said second clutch portion to stop said cam plate after said cam plate moves in the forward direction by a predetermined amount with said cam portion engaged with said switch unit when said rotational drive source rotates in a forward direction moving said mobile member to the first position, thereby causing the stop position of said cam plate to correspond to the first position of said mobile member.

7. A mobile member position detection apparatus according to claim 6, wherein said transmission plate includes a disk-like shape, and said transmission plate is engaged with said rotational drive source so as to rotate therewith.

8. A mobile member position detection apparatus according to claim 6, wherein said cam plate includes a disk-like shape, and said cam plate is operatively engaged with said transmission plate whereby torque transmitted from said transmission plate through said first and second clutch portions rotates said cam plate.

9. A mobile member position detection apparatus according to claim 7, wherein said cam plate includes a disk-like shape, and said cam plate is operatively engaged with said transmission plate whereby torque transmitted from said transmission plate through said first and second clutch portions rotate said cam plate.

10. A mobile member position detection apparatus according to claim 6, further comprising a wave washer for engaging said first clutch portion with said second clutch portion.

11. A mobile member position detection apparatus according to claim 6, wherein said means for releasing engagement between said first and second clutch portions includes a projecting portion for engaging with a stopper arranged at a position in the forward direction a predetermined amount relative to said cam plate, thereby stopping said cam plate.

12. A mobile member position detection apparatus according to claim 9, wherein said cam plate includes first and second gears inter-engaged between said cam plate and said transmission plate for increasing a speed of rotation transmitted from said transmission plate whereby said cam portion rotates with the increased speed.

13. A mobile member position detection apparatus according to claim 6, wherein said mobile member is a window glass of a vehicle, the first position is a closed position of said window glass, and said second position is an open position of said window glass.

14. A mobile member position detection apparatus according to claim 13, wherein a predetermined moving distance of said cam plate corresponds to a 4-mm moving distance of said window glass.

15. A mobile member position detection apparatus according to claim 6, wherein said mobile member is a sunroof of a vehicle, the first position is a closed position of said sunroof, and said second position is an open position of said sunroof.

16. A mobile member position detection apparatus for detecting a predetermined position of a mobile member moved between a first position and a second position by a drive force from a rotational drive source rotated in a forward or backward direction, comprising:

a switch unit for detecting the predetermined position of said mobile member by ON/OFF-operating said switch unit;

a transmission plate having a disk-like shape, said transmission plate being operatively connected to said rotational drive source so as to rotate with said rotational drive source by torque transmitted from said rotational drive source, said transmission plate further including a first clutch portion; and a cam plate having a disk-like shape, a cam portion formed to be engageable with said switch unit, and a second clutch portion operatively engaged with said first clutch portion so as to rotate together with said transmission plate said cam plate further including means for releasing engagement between said first clutch portion and said second clutch portion so as to stop said cam plate when said cam plate is rotated in the forward direction a predetermined amount with said cam portion engaged with said switch unit when said rotational drive source moves said mobile member in the forward direction to the forward direction, whereby a stop position of said cam plate corresponds to the first position of said mobile member.

17. A mobile member position detection apparatus according to claim 16, further comprising a wave washer for engaging said first clutch portion with said second clutch portion.

18. A mobile member position detection apparatus according to claim 16, wherein said means for releasing engagement between said first and second clutch portions includes a projecting portion for engaging with a stopper arranged at a position in the forward direction a predetermined amount, thereby stopping said cam plate.

19. A mobile member position detection apparatus according to claim 16, wherein said cam plate further includes first and second gears and increases a speed of rotation transmitted from said transmission plate to rotate said cam portion with the increased speed.

20. A mobile member position detection apparatus according to claim 16, wherein said mobile member is a window glass of a vehicle, the first position is a closed position of said window glass, and said second position is an open position of said window glass.

21. A window regulator driven by rotation of a driving motor mounted to a regular base, said window regulator having a window glass mounted thereto and a position detection apparatus for detecting a predetermined moving position of said window glass which is moved in forward and backward directions, said position detection apparatus comprising:

a sensor portion mounted to said window regular for detecting a predetermined moving position of said window glass;

a transmission plate connected to a rotating shaft of said window regulator and being always moved together with said rotating shaft by torque transmitted from said rotating shaft;

an operation plate rotated by torque transmitted from said transmission plate and having an operation portion which causes said sensor portion to operate at the predetermined moving position of said window glass; and a clutch mechanism for transmitting the torque from said transmission plate to said operation plate for interrupting transmission of forward torque from said transmission plate to said operation plate at the time when said operation plate is rotated in the forward direction by a predetermined amount after said sensor portion is operated.

22. The window regulator according to claim 21, wherein said sensor portion is a switch unit, said operation plate is a cam plate and said operation portion is a cam portion.

* * * * *